United States Patent
Goto et al.

[11] Patent Number: 5,320,901
[45] Date of Patent: Jun. 14, 1994

[54] MAGNETIC RECORDING MEDIUM

[75] Inventors: Narito Goto; Katsuyuki Takeda; Kunitsuna Sasaki; Nobuyuki Sekiguchi, all of Hino, Japan

[73] Assignee: Konica Corporation, Tokyo, Japan

[21] Appl. No.: 716,641

[22] Filed: Jun. 17, 1991

[30] Foreign Application Priority Data

Jun. 20, 1990 [JP] Japan .................. 2-161524
Jun. 21, 1990 [JP] Japan .................. 2-163170

[51] Int. Cl.$^5$ .................. B32B 5/16; G11B 5/66
[52] U.S. Cl. .................. 428/323; 428/329; 428/694; 428/900
[58] Field of Search .......... 428/323, 329, 694, 900

[56] References Cited

U.S. PATENT DOCUMENTS

| | | | |
|---|---|---|---|
| 4,390,361 | 6/1983 | Sugashi et al. | 428/404 |
| 4,801,505 | 1/1989 | Ejiri et al. | 428/403 |
| 4,851,289 | 7/1989 | Ogawa et al. | 428/900 |
| 4,851,289 | 7/1989 | Ogawa et al. | 428/329 |
| 4,980,230 | 12/1990 | Saito et al. | 428/900 |

FOREIGN PATENT DOCUMENTS 373563 6/1990 European Pat. Off. .

Primary Examiner—Paul J. Thibodeau
Assistant Examiner—Leszek Kiliman
Attorney, Agent, or Firm—Jordan B. Bierman

[57] ABSTRACT

A magnetic recording tape of plural magnetic coating layers, which has excellent properties of both the electromagnetic conversion properties, particularly the chromatic output, and the corrosion resistance is disclosed. The top layer contains magnetic metal powder having the weight ratio of Al to Fe being 0.005 to 0.2, and the lower layer has the coercive force of not less than 650 Oe and not more than 1200 Oe.

10 Claims, 2 Drawing Sheets

F I G. 3
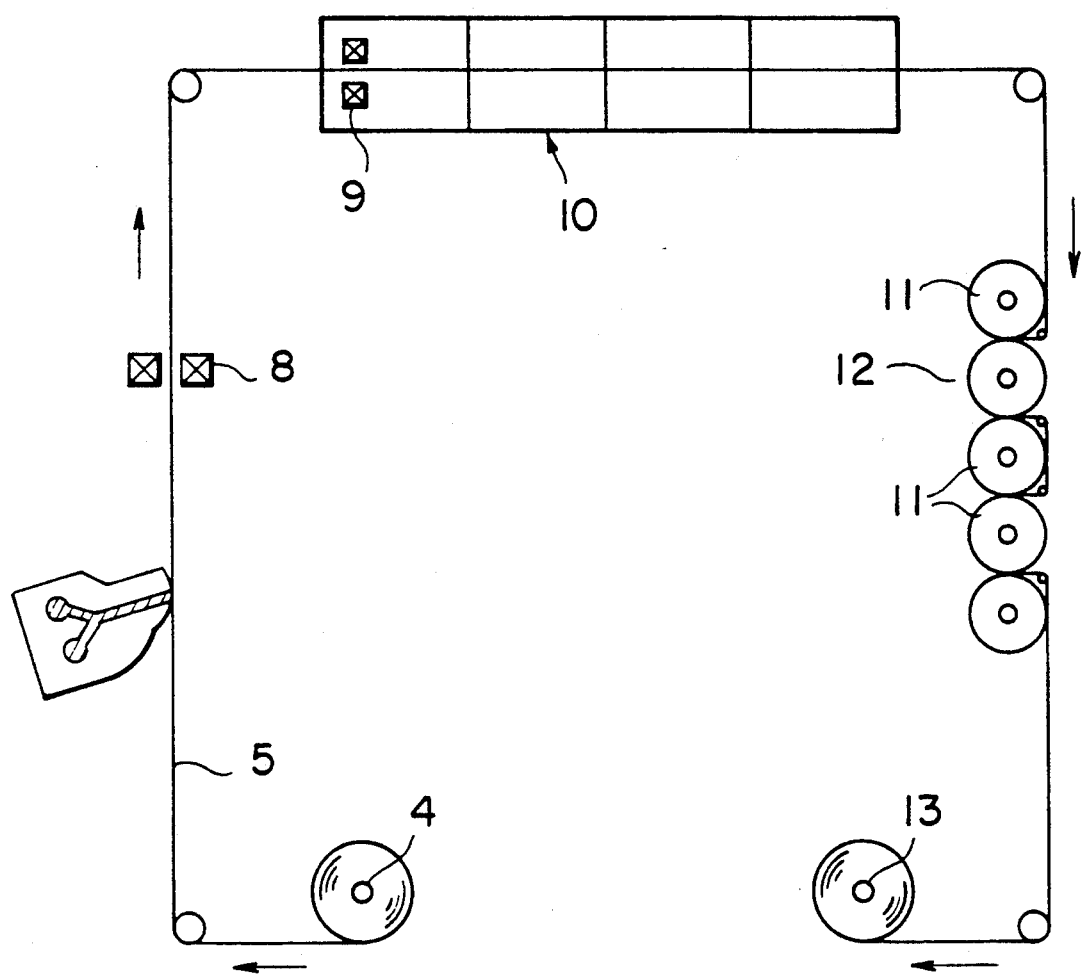

MAGNETIC RECORDING MEDIUM

FIELD OF THE INVENTION

The present invention relates to a magnetic recording medium, more specifically to a magnetic recording medium which offers excellent electromagnetic conversion properties and corrosion resistance.

BACKGROUND OF THE INVENTION

It is a common practice to incorporate ferromagnetic metal powder in the uppermost layer of a plurality of magnetic layers to improve magnetic recording medium properties [e.g., Japanese Patent Publication Open to Public Inspection (hereinafter referred to as Japanese Patent O. P. I. Publication) No. 19524/1989, Japanese Patent Application Nos. 77450/1989 and 79307/1989].

However, the method disclosed in Japanese Patent O. P. I. Publication No. 19524/1989 does not offer satisfactory improvement in the electromagnetic conversion properties or corrosion resistance, and the methods disclosed in Japanese Patent Application Nos. 77450/1989 and 79307/1989 do not offer satisfactory improvement in the electromagnetic conversion properties, particularly the chroma output.

SUMMARY OF THE INVENTION

The present invention was developed to overcome the problems described above.

It is an object of the present invention to provide a magnetic recording medium comprising a non-magnetic support and a plurality of magnetic layers formed thereon wherein both the electromagnetic conversion properties, particularly the chroma output, and the corrosion resistance are excellent.

To accomplish the object described above, the present invention comprises a magnetic recording medium characterized in that the ratio by weight of the Fe atoms and Al atoms in the ferromagnetic metal powder contained in the uppermost layer of the plurality of magnetic layers laminated on the non-magnetic support is 100:0.5 to 100:20, at least one magnetic layer other than the uppermost layer has a coercive force of 500 to 1200 Oe, the uppermost layer contains a ferromagnetic metal powder comprising grains having an average long axis length of lower than 0.25 $\mu$m and a crystal size of less than 200 Angstrom, and at least one magnetic layer other than the uppermost layer contains a ferromagnetic powder having an average long axis length of less than 0.25 $\mu$m.

BRIEF DESCRIPTION OF THE DRAWINGS

FIGS. 2 and 3 are flow charts of modes of the production process for a magnetic recording medium. In these figures, the numerical symbols 1 through 13 respectively denote the following:

1 ... non-magnetic support, 2 ... lower layer, 3 ... upper layer, 4 ... supply roll, 5 ... non-magnetic support, 6 and 7 ... coater, 8 ... first orientation magnet, 9 ... second orientation magnet, 10 ... dryer, 12 ... super-calenderer, 13 ... winding roll.

DETAILED DESCRIPTION OF THE INVENTION

Layer configuration

The magnetic recording medium of the present invention basically comprises a non-magnetic support and a plurality of magnetic layers, i.e., two or more magnetic layers, laminated thereon.

Figure 1:
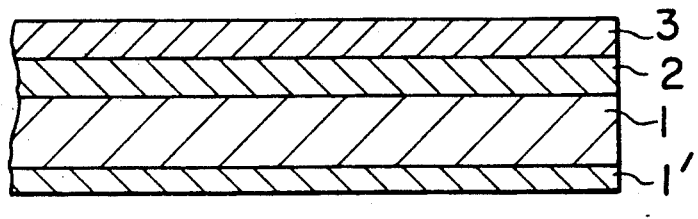
FIG. 1 shows a cross-sectional view of a mode of the magnetic recording medium of the present invention.

For example, the magnetic recording medium of the invention, when prepared with a double layer structure, is exemplified by a magnetic recording medium wherein a combination of an upper magnetic layer 2 and a lower magnetic layer 3 are formed on a non-magnetic support 1 as shown FIG. 1.

A back-coating layer 1' may be formed on the non-magnetic support's face opposite to the magnetic layer, i.e., the back face, for the purpose of improving the running property and prevention of charging and transfer, and an interlayer such as an adhesive layer may be formed between the magnetic layer and the non-magnetic support. Ferromagnetic metal powder, ferromagnetic powder Of the magnetic layers described above, the uppermost layer comprises a dispersion of ferromagnetic metal powder (Fe-Al alloy), while the magnetic layers other than the uppermost layer comprise a dispersion of a known ferromagnetic powder in a binder.

In the present invention, it is important that the weight by ratio of the Fe atoms and Al atoms in the ferromagnetic metal powder contained in the uppermost layer should be 100:0.5 to 100:20, and at least one layer other than the uppermost layer should have a coercive force (Hc) of 500 to 1200 Oe.

Meeting these requirements will provide excellent corrosion resistance and electromagnetic conversion properties for the magnetic recording medium of the present invention.

If the weight by ratio described above falls out of the range described above, the present invention is not satisfactorily effected.

Also, if the coercive force of at least one magnetic layer other than the uppermost layer is below 500 Oe, it deteriorates the RF output and Luminance S/N; if it exceeds 1200 Oe, the chroma output does not improve satisfactorily.

The ferromagnetic metal powder contained in the uppermost layer is an alloy powder containing at least Fe and Al, and may contain one or more other components such as Ca, Ni, P, Si and Mn.

When Al is contained in the uppermost layer within the weight ratio range, the dispersibility and dispersion stability of the magnetic coating solution improve, and the corrosion resistance of the magnetic recording medium improves.

When the uppermost layer contains Ca in addition to Al, the dispersibility and dispersion stability of the magnetic coating solution improve further, which permits maintenance of the electromagnetic conversion properties of the magnetic recording medium at high levels for a long period.

It is preferable that Ca be contained so that the ratio by weight of Fe and Ca is 100:0.1 to 100:10, more preferably 100:1 to 100: 7. The ferromagnetic powder incorporated in the uppermost layer is a ferromagnetic metal powder.

Examples of ferromagnetic powder include powders based mainly on Fe, Ni or Co such as magnetic powders of Fe-Al alloy, Fe-Al-Ni alloy, Fe-Al-Zn alloy, Fe-Al-Co alloy, Fe-Al-Ca alloy, Fe-Ni-Al alloy, Fe-Ni-Si-Al-Mn alloy, Fe-Ni-Si-Al-Zn alloy, Fe-Al-Si alloy, Fe-Al-Co alloy, Fe-Ni alloy, Fe-Ni-Zn alloy, Fe-Ni-Co alloy, Fe-Ni-Mn alloy, Fe-Ni-Si alloy, Fe-Mn-Zn alloy, Fe-Co-Ni-P alloy and Ni-Co alloy. Particularly, Fe-based metal powder is excellent in electric properties.

On the other hand, from the viewpoint of corrosion resistance and dispersibility, preference is given to Fe-based metal powders such as those of Fe-Al alloy, Fe-Al-Ca alloy, Fe-Al-Ni alloy, Fe-Al-Zn alloy, Fe-Al-Co alloy, Fe-Ni alloy, Fe-Ni-Zn alloy, Fe-Ni-Si-Al-Zn alloy, Fe-Ni-Si-Al-Mn alloy and Fe-Ni-Co alloy.

In the present invention, the ferromagnetic metal powder used in the uppermost layer preferably meet the following requirements.

The coercive force is normally 600 to 5000 Oe, preferably 800 to 5000 Oe and more preferably 1000 to 2000.

In this case, too low or too high coercive forces are undesirable because a coercive force below 600 Oe sometimes degrades the RF output and Luminance S/N and because a coercive force exceeding 5000 Oe sometimes makes recording with an ordinary head impossible.

The specific surface area of the ferromagnetic metal powder described above, expressed in BET value, is normally not less than 30 $m^2/g$, preferably not less than 50 $m^2/g$.

When the specific surface area falls in this range, it is easily possible to obtain a recording medium which permits high density recording and which is excellent in S/N ratio and other properties.

With respect to the ferromagnetic metal powder described above, the saturation magnetization amount ($\sigma_s$), a magnetic property, is normally not less than 70 emu/g, preferably not less than 100 emu/g and more preferably not less than 120 emu/g.

When this saturation magnetization amount is below 70 emu/g, deterioration sometimes occur in the electromagnetic conversion properties.

Examples of the ferromagnetic powder contained in a magnetic layer other than the uppermost layer include powders of ferromagnetic metal such as Co-containing $\gamma$-FeO$_x$ powder, Co-adsorbed type, Co-doped type, Co-containing Fe$_3$O$_4$ powder, Fe-Al alloy powder, Fe-Ni alloy powder, Fe-Al-Ca alloy powder, Fe-Al-Ni alloy powder, Fe-Al-P alloy powder, Fe-Ni-Si-Al alloy powder, Fe-Ni-Si-Al-Mn alloy powder, Ni-Co alloy powder, Fe-Mn-Zn alloy powder, Fe-Ni-Zn alloy powder, Fe-Co-Ni-Cr alloy powder, Fe-Co-Ni-P alloy powder, Co-Ni alloy powder and Co-P alloy powder.

Of these ferromagnetic powders, fine powder of Co-containing $\gamma$-FeO$_x$ (X is 1.33 to 1.5) is preferred.

These ferromagnetic powders may be used singly or in combination of two or more kinds.

In the present invention, the ferromagnetic powder used in a magnetic layer other than the uppermost layer preferably meet the following requirements.

The coercive force is normally 500 to 1200 Oe, preferably 650 to 1200 Oe. In this case, too low or too high coercive forces are undesirable because a coercive force below 500 Oe sometimes degrades the RF output and Luminance S/N and because coercive force exceeding 1200 Oe sometimes fails to offer satisfactory improvement in the chroma output.

The specific surface area of the ferromagnetic powder expressed in BET value is normally 20 to 60 $m^2/g$, preferably 30 to 50 $m^2/g$.

When the specific surface area falls in this range, it is easily possible to obtain a recording medium which permits high density recording and which is excellent in S/N ratio and other properties.

Neither the ferromagnetic metal powder nor ferromagnetic powder described above is subject to morphological limitation, as long as it is fine; any form, such as a needle, spherical or ellipsoidal form, can be used.

It is important to the present invention that the uppermost layer contains a ferromagnetic metal powder comprising grains having an average long axis length of lower than 0.25 [Lm and a crystal size below 200 Angstrom, and least one magnetic layer other than the uppermost layer contains a ferromagnetic powder comprising grains having an average long axis length of lower than 0.25 μm.

It is also preferable that the uppermost layer contain a ferromagnetic alloy powder comprising grains having an average long axis length of lower than 0.15 [μm, a crystal size of lower than 150 Angstrom and a BET value of not less than 55 $m^2/g$.

Meeting these requirements makes it possible to improve the electromagnetic conversion properties of the magnetic recording medium of the present invention.

A lack of any one of the requirements described above hampers the obtainment of the effect of the desired effect.

Accordingly, if the uppermost layer contains a nonmetallic ferromagnetic powder, or if it contains a ferromagnetic metal powder but it comprises grains having an average long axis length of not less than 0.25 [μm or a crystal size of not less than 200 Angstrom, or if the ferromagnetic powder contained in at least one magnetic layer other than$_a$ the uppermost layer has an average long axis length of not less than 0.25 [μm, it is impossible to improve the electromagnetic conversion properties.

In the present invention, although the thickness of each magnetic layer is not subject to limitation, the thickness of the uppermost layer is normally 0.1 to 1.5 [μm, preferably 0.3 to 1.0 [μm, and the thickness of each layer other than the uppermost layer is normally 0.3 to 3.0 [μm, preferably 0.5 to 2.0 μm.

Binder

In the present invention, it is preferable to use a resin modified by introducing a functional group, particularly a modified =vinyl chloride resin, a modified polyurethane resin (including urethane elastomers) or a modified polyester resin as a binder contained in each of the magnetic layers (the uppermost layer and other magnetic layers).

Examples of preferred functional groups include —SO$_3$M, —OSO$_2$M, —COOM and

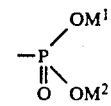

wherein M represents a hydrogen atom or an alkali metal such as lithium, potassium or sodium; $M^1$ and $M^2$ whether identical or not, independently represent a hydrogen atom, lithium, potassium, sodium or an alkyl group.

The functional group described above acts to improve the dispersibility of ferromagnetic powder, and its content in each resin is 0.1 to 8.0 mol % preferably 0.5 to 6.0 mol %.

If this content is below 0.1 mol % the dispersibility of ferromagnetic powder decreases, while if it exceeds 8.0 mol % the magnetic coating solution becomes liable to gelation.

The weight-average molecular weight of each resin described above is preferably 15000 to 50000.

The binder content in a magnetic layer is normally 10 to 40 parts by weight, preferably 15 to 30 parts by weight to 100 parts by weight of ferromagnetic powder.

These binders may be used in combination of two or more kinds as well as singly. In this case, the ratio of polyurethane and/or polyester and vinyl chloride resin is normally 90:10 to 10:90, preferably 70:30 to 30:70 by weight.

The vinyl chloride copolymer containing a functional group which is used as a binder for the present invention can be synthesized by addition reaction of a copolymer containing a hydroxyl group such as a vinyl chloride-vinyl alcohol copolymer, and one of the following compounds having a functional group and chlorine atom.

Cl—CH$_2$CH$_2$SO$_3$M
Cl—CH$_2$CH$_2$0SO$_2$M
Cl—CH$_2$COOM

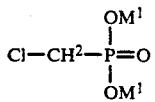

With reference to Cl—CH$_2$CH$_2$SO$_3$Na, the reaction can be explained as follows:

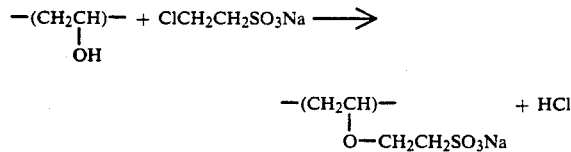

A vinyl chloride copolymer containing a functional group can be obtained by charging a reactor such as an autoclave with a given amount of a reactive monomer having an unsaturated bond to introduce a repeat unit containing a functional group therein and carrying out polymerization in the presence of a common polymerization initiator, e.g., a radical polymerization initiator such as BPO (benzoyl peroxide) or AIBN (azobisisobutylonitrile), a redox polymerization initiator or a cationic polymerization initiator.

Examples of the reactive monomer to introduce sulfonic acid or its salt thereto include unsaturated hydrocarbon sulfonic acids such as vinylsulfonic acid, arylsulfonic acid, methacrylsulfonic acid and p-styrenesulfonic acid and salts thereof.

When introducing a carboxylic acid or its salt, (meth)acrylic acid or maleic acid may be used; when phosphoric acid or its salt is introduced, (meth)acrylic acid-2-phosphate may be used.

The vinyl chloride copolymer preferably has an epoxy group introduced therein.

This is because such introduction improves the heat stability of the polymer.

When introducing an epoxy group, the content of the epoxy-containing repeat unit in the copolymer is preferably 1 to 30 mol %, more preferably 1 to 20 mol %.

Examples of the monomer to introduce an epoxy group therein include glycidyl acrylate.

Methods of introducing a functional group to vinyl chloride copolymer are described in Japanese Patent O. P. I. Publication Nos. 44227/1982, 108052/1983, 8127/1984, 101161/1985, 235814/1985, 238306/1985, 238371/1985, 121923/1987, 146432/1987 and 146433/1987 and other publications, which methods can be used for the present invention.

The synthesis of the polyester and polyurethane used for the present invention are described below.

Generally, polyester is prepared by reaction of polyol and polybasic acid.

Utilizing this known method, a polyester having a functional group (polyol) can be synthesized from a combination of polyol and a polybasic acid having a functional group.

Examples of polybasic acids having a functional group include 5-sulfoisophthalic acid, 2-sulfoisophthalic acid, 4-sulfoisophthalic acid, 3-sulfophthalic acid, dialkyl 5-sulfoisophthalate, dialkyl 2-sulfoisophthalate, dialkyl 4-sulfoisophthalate, dialkyl 3-sulfo and potassium salts thereof.

Examples of polyol include trimethylolpropane, hexanetriol, glycerol, trimethylolethane, neopentyl glycol, pentaerythritol, ethylene glycol, propylene glycol, 1,3-butanediol, 1,4-butanediol, 1,6-hexanlediol, diethylene glycol and cyclohexanedimethanol.

It is also possible to synthesize a polyester incorporating another functional group by a known method.

The synthesis of polyurethane is described below.

It is prepared by reaction of polyol and polyisocyanate.

The polyol used for this purpose is normally a polyester polyol obtained by reaction of polyol and polybasic acid.

It is therefore possible to synthesize a polyurethane having a functional group by using a polyester polyol having a functional group as a starting material.

Examples of polyisocyanate include diphenylmethane-4,4'-diisocyanate (MDI), hexamethylenediisocyanate (HMDI), totylenediisocyanate (TDI), 1,5-naphthalenediisocyanate (NDI), tolydinediisocyanate (TODI) and lysineisocyanate methyl ester (LDI).

As another approach to the synthesis of polyurethane having a functional group, addition reaction is also effective between a polyurethane having a hydroxyl group and one of the following compounds having a functional group and a chlorine atom.

Cl—CH$_2$CH$_2$SO$_3$M

Cl—CH$_2$CH$_2$OSO$_2$M

Cl—CH$_2$COOM

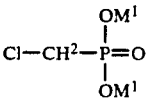

Methods of introducing a functional group to polyurethane are described in Japanese Examined Patent Publication No. 41565/1983, Japanese Patent O. P. I. Publication Nos. 92422/1982, 92423/1982, 8127/1984, 5423/1984, 5424/1984 and 121923/1987 and other publications, which methods can be used for the present invention.

In the present invention, the following resins can be used in combination as binders in amounts not more than 20 wt % of the total content of the binder.

Examples of the resin include vinyl chloride-vinyl acetate copolymer, vinyl chloride-vinylidene chloride copolymer, vinyl chloride-acrylonitrile copolymer, butadiene-acrylonitrile copolymer, polyamide resin, polyvinylbutyral, cellulose derivatives such as nitrocellulose, styrene-butadiene copolymer, various synthetic rubber resins, phenol resin, epoxy resin, urea resin, melamine resin, phenoxy resin, silicone resin, acrylic resin and urea-formamide resin, which resins have a weight-average molecular weight of 10000 to 200000. Other components In the present invention, it is preferable to add polyisocyanate to the magnetic layer to improve the durability of the magnetic layer.

Examples of polyisocyanate include aromatic polyisocyanates such as active hydrogen compound adducts of tolylenediisocyanate (TDI) and aliphatic polyisocyanates such as active hydrogen compound adducts of hexamethylene diisocyanate (HMDI).

The weight-average molecular weight of polyisocyanate is desirably 100 to 3000.

In the present invention, the magnetic layer may contain one or more additives such as a dispersant, lubricant, abrasive, antistatic agent, and filler as necessary.

Examples of dispersants include fatty acids having a carbon number of 12 to 18 such as caprylic acid, captic acid, lauric acid, myristic acid, palmitic acid, stearic acid and oleic acid; alkali metal salts, alkaline earth metal salts or amides thereof; polyalkylene oxide alkylphosphates; lecithin; trialkylpolyolefin oxy-quaternary-ammonium salt; and azo compounds having a carboxyl group and a sulfonic acid group.

These dispersants are used normally in 0.5 to 5 wt % of ferromagnetic powder.

Fatty acid and/or fatty acid ester can be used as a lubricant.

In this case, the addition amount of fatty acid is preferably 0.2 to 10 wt %, more preferably 0.5 to 5 wt % of ferromagnetic powder.

If the addition amount is below 0.2 wt %, the running property becomes liable to deterioration; if it exceeds 10 wt % fatty acid oozes out on the surface of magnetic layer and output reduction becomes more likely to occur.

The addition amount of fatty acid ester is preferably 0.2 to 10 wt %, more preferably 0.5 to 5 wt % of ferromagnetic powder.

If the addition amount is below 0 2 wt % the still flame durability becomes more liable to deterioration; if it exceeds 10 wt % fatty acid oozes out on the surface of magnetic layer and output reduction becomes more likely to occur.

For enhancing the lubricating effect by using fatty acid and fatty acid ester in combination, the weight ratio of the fatty acid and fatty acid ester is preferably 10:90 to 90:10.

The fatty acid may be monobasic or dibasic, preferably having a carbon number of 6 to 30, more preferably 12 to 22.

Examples of fatty acids include caproic acid, caprylic acid, lauric acid, myristic acid, palmitic acid, stearic acid, isostearic acid, linoleic acid, oleic acid, elaidic acid, behenic acid, malonic acid, succinic acid, maleic acid, glutaric acid, adipic acid, pimelic acid, azelaic acid, sebacic acid, 1,12-dodecanedicarboxylic acid and octanedicarboxylic acid.

Examples of fatty acid esters include oleyl oleate, isocetyl stearate, dioleyl maleate, butyl stearate, butyl palmitate, butyl myristate, octyl myristate, octyl palmitate, pentyl stearate, pentyl palmirate, isobuty, oleate, stearyl stearate, lauryl oleate, octyl oleate, isobutyl oleate, ethyl oleate, isotridecyl oleate, 2-ethylhexyl stearate, 2-ethylhexyl palmirate, isopropyl palmitate, isopropyl myristate, butyl laurate, cetyl-2-ethyl hexarate, dioleyl adipate, diethyl adipate, diisobutyl adipate, diisodecyl adipate, oleyl stearate, 2-ethylhexyl myristate, isopentyl palmitate, isopentyl stearate, diethylene glycol-mono-butyl ether palmitate and diethylene glycol-mono-butyl ether palmitate.

In addition to the fatty acids and fatty acid esters described above, silicone oil, graphite, carbon fluoride, molybdenum disulfide, tungsten disulfide, fatty acid amide and (z-olefin oxide etc. can be used.

Examples of abrasives include (z-alumina, fused alumina, chromium oxide, titanium oxide, (z-iron oxide, silicon oxide, silicon nitride, tungsten carbide, molybdenum carbide, boron carbide, corundum, zinc oxide, cerium oxide, magnesium oxide and boron nitride.

The average grain size of the abrasive is preferably 0.05 to 0.6 $\mu$m, more preferably 0.1 to 0.3 $\mu$m.

Examples of antistatic agents include electro-conductive powders such as carbon black and graphite; cationic surfactants such as quaternary amine; anionic surfactants containing an acid group such as sulfonic acid, sulfuric acid, phosphoric acid, phosphate and carboxylic acid; amphoteric surfactants such as aminosulfonic acid; and natural surfactants such as saponin.

The antistatic agent is added normally at 0.01 to 40 wt % of the binder.

When the modified resin contains such a functional group, its compatibility with the ferromagnetic metal powder and ferromagnetic powder described above improves and these ferromagnetic powders become more dispersible but also the coating solution becomes more stable because ferromagnetic powder aggregation is prevented, which leads to a well-balanced improvement in the frequency characteristics ranging from the high frequency to low frequency bands and improvements in the durability of the magnetic recording medium as well as in the electromagnetic conversion properties.

The modified resin can be produced by dehydrochlorination condensation of vinyl chloride resin, polyurethane resin or polyester resin and a compound having a negative functional group and chlorine in the molecular structure, such as $Cl-CH_2CH_2SO_3M$, $Cl-CH_2C-H_2OSO_2M$, $Cl-CH_2COOM$ or

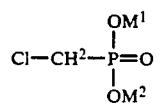

In the present invention, it is possible to use a thermoplastic resin, thermosetting resin, reactive resin, electron beam setting resin which has traditionally been known in the field of magnetic recording medium or a mixture thereof, and these resins may be used in combination with the modified resin.

Examples of the thermoplastic resin include vinyl chloride-vinyl acetate copolymer, vinyl chloride-vinylidene chloride copolymer, vinyl chloride-acrylonitrile copolymer, acrylate-acrylonitrile copolymer, acrylate-vinylidene chloride copolymer, methacrylate-vinylidene chloride copolymer, methacrylate-ethylene copolymer, polyvinyl fluoride, vinylidene chloride-acrylonitrile copolymer, acrylonitrile-butadiene copolymer, polyamide resin, polyvinylbutyral, cellulose derivatives such as cellulose acetate butyrate, cellulose diacetate, cellulose triacetate, cellulose propionate and nitrocellulose, styrene-butadiene copolymer, polyester resin, chlorovinyl ether-acrylate copolymer, amino resin and synthetic rubber based thermoplastic resins.

Examples of the thermosetting resin or reactive resin include phenol resin, epoxy resin, polyurethane setting resin, urea resin, melamine resin, alkyd resin, silicone resin, acrylic reactive resin, high molecular polyester resin-isocyanate prepolymer mixture, methacrylate copolymer-diisocyanate prepolymer mixture, urea-formaldehyde resin and polyamine resin.

Examples of the electron beam setting resin include unsaturated prepolymers of the maleic anhydride type, urethane acrylic type, epoxy acrylic type, polyester acrylic type, polyether acrylic type, polyurethane acrylic type, polyamide acrylic type and other types and polyfunctional monomers of the ether acrylic type, urethane acrylic type, epoxy acrylic type, phosphate acrylic type, aryl type, hydrocarbon type and other types.

In the present invention, the binders described above may be used singly or in combination of two or more kinds.

The formula content of the binder in each magnetic layer is normally 1 to 200 parts by weight, preferably 1 to 50 parts by weight to 100 parts by weight of the ferromagnetic metal powder or ferromagnetic powder.

Too high a formula content of the binder results in a lower content of the ferromagnetic metal powder or ferromagnetic powder and can degrade the recording density of the magnetic recording medium; too low a formula content of the binder results in a reduction in the mechanical strength of the magnetic layer and can degrade the running durability of the magnetic recording medium.

In the present invention, it is possible to use an aromatic or aliphatic polyisocyanate as a hardener in combination with the binder described above.

Examples of aromatic polyisocyanates include tolylene diisocyanate (TDI) and active hydrogen compound adducts thereof, with preference given to those having an average molecular weight of 100 to 3000.

Examples of aliphatic polyisocyanates include hexamethylene diisocyanate (HMDI) and active hydrogen compound adducts thereof, with preference given to those having an average molecular weight of 100 to 3000. Also preferred are non-aliphatocyclic polyisocyanates and active hydrogen compound adducts thereof.

The addition ratio of the aromatic or aliphatic polyisocyanate is normally 1/20 to 7/10 by weight, preferably 1/10 to ½ by weight to the binder.

Other components

The magnetic recording medium of the present invention may contain in each magnetic layer various additives such as a lubricant, non-magnetic abrasive grains, electro-conductive powder and a surfactant.

Examples of the lubricant include silicone oil, graphite, molybdenum disulfide and fatty acid esters comprising a monobasic fatty acid having a carbon number of about 12 to 20 such as stearic acid and a monovalent alcohol having a carbon number of about 3 to 26.

Examples of the non-magnetic abrasive grains include alumina such as $\alpha$-$Al_2O_3$ (corundum), artificial corundum, fused alumina, silicon carbide, chromium oxide, iron oxides ($\alpha$-$Fe_2O_3$), zirconia and silica.

With respect to the abrasive grains, the content is preferably not more than 20 parts by weight to the ferromagnetic powder, and the average grain size is preferably not more than 0.5 $\mu$m, more preferably not more than 0.4 $\mu$m.

It is possible to improve the head contact properties such as sliding running and wear resistance by adding the lubricant and non-magnetic abrasive grains described above to the outermost magnetic layer.

Examples of the electro-conductive powder include carbon black, graphite, silver powder and nickel powder. Examples of the surfactant include natural, non-ionic, anionic, cationic and amphoteric surfactants.

By adding these electro-conductive powders and surfactants to a magnetic layer, particularly the outermost magnetic layer, the surface electric resistance can be efficiently lowered and noise due to discharge of electric charge and the drop-out phenomenon due to dust adherence can be prevented.

As for the thickness of each magnetic layer, it is not subject to limitation, but the total thickness of the magnetic layers is normally 0.1 to 5 $\mu$m.

Non-magnetic support

Examples of materials for the non-magnetic support include polyesters such as polyethylene terephthalate and polyethylene 2,6-naphthalate, polyolefins such as polypropylene, cellulose derivatives such as cellulose triacetate and cellulose diacetate, plastics such as polyamide and polycarbonate, metals such as copper, aluminum and zinc, glass, boron nitride, silicon carbide and ceramics.

The non-magnetic support is not subject to morphological limitation; any form is acceptable, including a tape, film, sheet, card, disc and drum.

The non-magnetic support is not subject to limitation with respect to thickness; for example, the thickness is normally 3 to 100 $\mu$m, preferably 5 to 50 $\mu$m for a film or sheet, about 30 $\mu$m to 10 mm for a disc or card, and can be set at appropriate level according to the recorder etc. for a drum.

The non-magnetic support may be of a single layer structure or multiple layer structure.

The non-magnetic support may be provided with a resin subbing layer, and may be subjected to an adhesion-facilitating surface treatment such as corona discharge treatment. Preparation of magnetic recording medium The magnetic recording medium of the present invention is not subject to limitation with respect to its preparation method; it can be produced in accordance with a known production method for a magnetic recording medium of the double or multiple layer structure.

For example, magnetic layer forming components such as ferromagnetic metal powder or ferromagnetic powder and a binder are kneaded and dispersed in a solvent to yield a magnetic coating solution, which is then coated on the surface of a non-magnetic support.

Examples of the solvent include ketones such as acetone, methyl ethyl ketone (MEK), methyl isobutyl ketone (MIBK) and cyclohexanone, alcohols such as methanol, ethanol and propanol, esters such as methyl acetate, ethyl acetate, butyl acetate, propyl acetate, ethyl lactate and ethylene glycol monoacetate, ethers such as diethylene glycol dimethyl ether, 2-ethoxyethanol, tetrahydrofuran and dioxane, aromatic hydrocarbons such as benzene, toluene and xylene and halogenated hydrocarbons such as methylene chloride, ethylene chloride, carbon tetrachloride, chloroform, ethylene chlorohydrin and dichlorobenzene.

In the preparation of a magnetic coating solution, the ferromagnetic powder and other magnetic layer forming components described above are charged in a kneader simultaneously or separately.

For example, the ferromagnetic metal powder or ferromagnetic powder described above is added to a solution containing a dispersant, and after kneading for a given time, the remaining components are added, followed by further kneading to yield a magnetic coating solution.

In the kneading and dispersion of the magnetic layer forming components, various kneaders can be used.

Examples of the kneader include the double-roll mill, triple-roll mill, ball mill, pebble mill, side grinder, Sqegvari attriter, high speed impeller disperser, high speed stone mill, high speed impact mill, disper kneader, high speed mixer, homogenizer and ultrasonic disperser.

Examples of coating methods include the wet-on-wet method and the wet-on-dry method, with preference given to the wet-on-wet method.

The wet-on-wet method makes the surface (interface) of the lower layer smooth and improves the surface properties of the upper layer and offers sufficient adhesion between the upper and lower layers since the upper layer is coated on the lower layer while the lower layer remains wet. This method is advantageous over the other coating methods in that it is more productive and makes it easier to make the upper layer thin.

Examples of magnetic coating solution coating methods include gravure coating, knife coating, wire bar coating, doctor blade coating, reverse roll coating, dip coating, air knife coating, calender coating, squeeze coating, kiss coating, extrusion coating and fountain coating.

After coating the magnetic coating solution on the non-magnetic support, the coat while remaining undried is subjected to a magnetic field orientation treatment followed by a surface smoothing treatment using a super-calender roll or another means.

Figure 2:
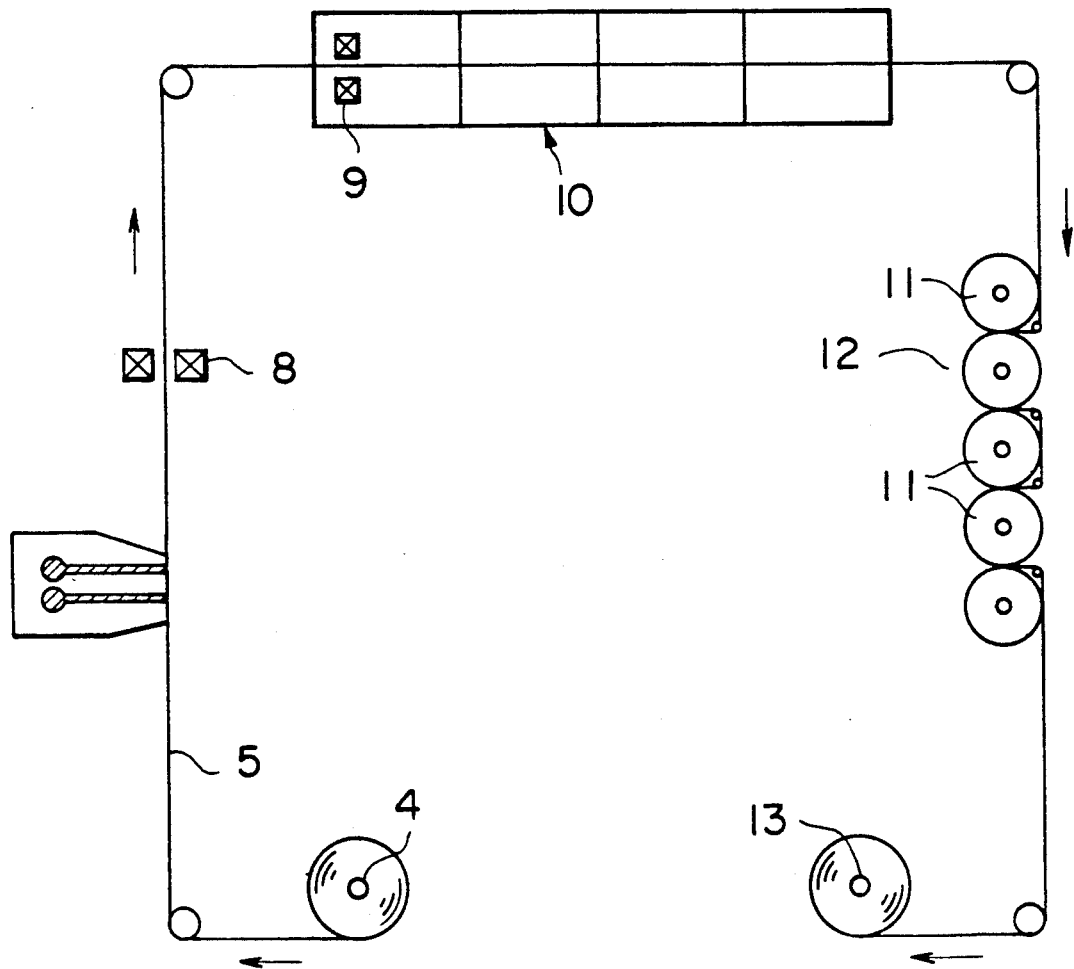

FIGS. 2 and 3 illustrate modes of the process described above, in which the film-like non-magnetic support 5, wound back from the supply roll 4, is double coated with the magnetic coating solutions for the lower and upper layers by means of the extrusion coaters 6 and 7 having a liquid reservoir 6a or 7a, respectively, after which it is passed by the first orientation magnet 8 and is introduced to the drying zone 10 equipped with the second orientation magnet 9, where it is dried by hot blow from the upper and lower nozzles.

The non-magnetic support 5 having magnetic layers thus dried is transported to the super-calenderer 12 which comprises a combination of calender rolls 11, where it is calendered and then wound up on the winding roll 13.

The bulk strip thus obtained is cut into pieces with the desired shape and size to yield a magnetic recording medium.

The present invention makes it possible to provide a magnetic recording medium which is excellent in electromagnetic conversion properties and corrosion resistance.

EXAMPLES

The present invention is hereinafter described in more detail by means of the following working examples and comparative examples. In the examples below, "part(s)" means "part(s) by weight".

EXAMPLE 1

The following coating solution composition for the upper layer was kneaded and dispersed to yield a coating solution A.

Coating solution composition for the upper layer

Ferromagnetic metal powder (weight ratio of Fe and Al=100:5, Hc=1580 Oe, $\sigma_s$=120 emu/g, BET value=55.5 m$^2$/g) 100 parts vinyl chloride-vinyl acetate resin containing potassium sulfonate 10 parts Polyurethane resin containing sodium sulfonate (UR-8300, product of Toyoho Ltd.) 5 parts α-A1203 having a grain size of 0.2 μm 5 parts Carbon black 1 part Myristic acid 1 part Stearic acid 1 part Butyl stearate 1 part Cyclohexanone 100 parts Methyl ethyl ketone 100 parts Toluene 100 parts A coating solution B was prepared by kneading and dispersing a lower layer coating solution composition which had the same composition as the upper layer coating solution composition except that the ferromagnetic metal powder was replaced with an Co-containing magnetic oxide having an Hc value of 600 Oe and a BET value of 30 m$^2$/g.

Next, the coating 5 parts each of polyisocyanate (colonere L, manufactured by Nihon Polyurethane Industry Co., Ltd.) were added to the magnetic paint A and B were coated and dried on a polyethylene terephthalate film of 10 μm in thickness by the wet-on-wet method to form a magnetic layer comprising an upper layer of 0.5 μm in thickness and a lower layer of 2.5 μm in thickness.

Subsequently, a coating solution C with the following composition was coated on the face of the polyethylene terephthalate film opposite to the magnetic layer to yield a back-coating layer having a dry thickness of 0.8 μm.

Coating solution composition for back-coating layer

Carbon black Raven 1035 40 parts

Barium sulfate having a grain size of 300 mμ 10 parts

Nitrocellulose 25 parts

Polyurethane (N-2301, produced by Nippon Polyurethane
  Industry) 25 parts

Polyisocyanate compound (Coronate L, produced by Nippon Polyurethane Industry) 10 parts Cyclohexanone 400 parts Methyl ethyl ketone 250 parts Toluene 250 parts The bulk strip thus obtained was cut into 8 mm wide tape, and the performance of the 8-mm tape thus obtained was evaluated as follows:

The results are given in Table 1.

RF output and chroma output

Measured on the Sony 8 mm video movie V900 using the Shibasoku noise meter 925C.

Luminance S/N

A pure white signal was input at a reference level onto the tape sample, and the reproduced video signal is input to the Shibasoku noise meter 921 D/1. From the obtained absolute value of noise, the Luminance S/N is read.

Chroma S/N

Using a Shibasoku noise meter, the S/N of the tape sample for chroma signal was determined in comparison with the reference tape.

Corrosion resistance (weather resistance)

The value for magnetic properties obtained before an incubation test of the tape sample (Bin) is expressed in percent ratio to the value obtained after the incubation test (Bm').

The incubation test was carried out at a temperature of 60° C. and a relative humidity of 80% for 7 days.

EXAMPLE 2

An experiment was made in the same manner as in Example 1 except that the Co-containing magnetic oxide in the lower layer coating composition was replaced with that having an Hc value of 800 Oe and a BET value of 50 $m^2/g$.

EXAMPLE 3

An experiment was made in the same manner as in Example 1 except that the Co-containing magnetic oxide in the lower layer coating composition was replaced with that having an Hc value of 1000 Oe and a BET value of 55 $m^2/g$.

EXAMPLE 4

An experiment was made in the same manner as in Example 1 except that the weight ratio of Fe and Al in the ferromagnetic metal powder in the upper layer coating composition was changed to 100:2.

EXAMPLE 5

An experiment was made in the same manner as in Example 1 except that the weight ratio of Fe and Al in the ferromagnetic metal powder in the upper layer coating composition was changed to 100: 10.

EXAMPLE 6

An experiment was made in the same manner as in Example 1 except that the Weight ratio of Fe and Al in the ferromagnetic metal powder in the upper layer coating composition was changed to 100:15.

Comparative Example

An experiment was made in the same manner as in Example 1 except that the Co-containing magnetic oxide in the lower layer coating composition was replaced with that having an Hc value of 405 Oe and a BET value of 30 $m^2/g$.

Comparative Example 2

An experiment was made in the same manner as in Example 1 except that the Co-containing magnetic oxide in the lower layer coating composition was replaced with that having an Hc value of 1220 Oe and a BET value of 57 $m^2/g$.

Comparative Example 3

An experiment was made in the same manner as in Example 1 except that the Co-containing magnetic oxide in the lower layer coating composition was replaced with a ferromagnetic metal powder having an Hc value of 1545 Oe and a BET value of 56 $m^2/g$.

Comparative Example 4

An experiment was made in the same manner as in Example 1 except that the weight ratio of Fe and Al in the ferromagnetic metal powder in the upper layer coating composition was changed to 100: 0.2.

Comparative Example 5

An experiment was made in the same manner as in Comparative Example 4 except that the weight ratio of Fe and Al in the ferromagnetic metal powder was changed to 100:25.

Comparative Example 6

An experiment was made in the same manner as in Example 1 except that the Fe/Al in the ferromagnetic metal powder in the upper layer coating composition was replaced with Fe/Ni.

EXAMPLES 7 through 11

Experiments were made in the same manner as in Example 1 except that the composition of the ferromagnetic metal powder in the upper layer, the weight ratio of the elements in the metal powder and the Hc in the lower layer were changed as shown in Table 1.

The performance of the obtained 8-ram tapes was evaluated in the same manner as above.

TABLE 1

| | Examples | | | | | | Comparative Examples | | |
| --- | --- | --- | --- | --- | --- | --- | --- | --- | --- |
| | 1 | 2 | 3 | 4 | 5 | 6 | 1 | 2 | 3 |
| Drop-out at 12 dB (15 μs/sμs) | 40/97 | 23/62 | 20/58 | 45/108 | 47/102 | 51/121 | 76/167 | 75/171 | 91/324 |
| Composition of the upper layer ferromagnetic metal powder | Fe/Al | Fe/Al | Fe/Al | Fe/Al | Fe/Al | Fe/Al | Fe/Al | Fe/Al | Fe/Al |
| Weight ratio of the elements in the upper layer ferromagnetic metal powder | 100:5 | 100:5 | 100:5 | 100:2 | 100:10 | 100:15 | 100:5 | 100:5 | 100:5 |
| Lower layer Hc (Oe) | 650 | 900 | 1100 | 650 | 650 | 650 | 450 | 1300 | 1550 |
| RF output (dB) | 1.1 | 1.7 | 1.8 | 1.1 | 1.0 | 0.9 | 0.4 | 1.7 | 1.8 |
| Luminance S/N (dB) | 0.7 | 1.2 | 1.2 | 0.6 | 0.5 | 0.4 | 0.2 | 1.2 | 1.2 |
| Chroma output (dB) | 3.5 | 3.0 | 2.7 | 3.5 | 3.3 | 3.3 | 3.9 | 1.4 | 0.1 |
| Chroma S/N (dB) | 0.7 | 0.6 | 0.8 | 0.7 | 0.6 | 0.6 | 0.5 | 0.6 | 0.7 |

TABLE 1-continued

|  | | | | | | | | | |
|---|---|---|---|---|---|---|---|---|---|
| Bm'/Bm (%) | 95 | 95 | 95 | 93 | 96 | 97 | 95 | 95 | 95 |
| BET value (magnetic metal powder of the upper layer) (m²/g) | 55.5 | 55.5 | 55.5 | 55.5 | 55.5 | 55.5 | 55.5 | 55.5 | 55.5 |
| Average long axis length (magnetic metal powder of the upper layer) (μm) | 0.16 | 0.16 | 0.16 | 0.16 | 0.16 | 0.16 | 0.16 | 0.16 | 0.16 |
| Crystal size (magnetic metal powder of the upper layer) (Å) | 150 | 150 | 150 | 150 | 150 | 150 | 150 | 150 | 150 |
| BET value (magnetic metal powder of the lower layer) (m²/g) | 30 | 50 | 55 | 30 | 30 | 30 | 30 | 57 | 56 |
| Average long axis length (magnetic metal powder of the lower layer) (μm) | 0.32 | 0.16 | 0.14 | 0.32 | 0.32 | 0.32 | 0.32 | 0.14 | 0.14 |
| Crystal size (magnetic metal powder of the lower layer) (Å) | 430 | 320 | 280 | 430 | 430 | 430 | 430 | 280 | 280 |

|  | Comparative Examples | | | Examples | | | | |
|---|---|---|---|---|---|---|---|---|
|  | 4 | 5 | 6 | 7 | 8 | 9 | 10 | 11 |
| Drop-out at 12 dB (15 μs/sμs) | 69/166 | 70/169 | 101/361 | 48/113 | 12/19 | 21/53 | 10/18 | 20/51 |
| Composition of the upper layer ferromagnetic metal powder | Fe/Al | Fe/Al | Fe/Ni | Fe/Al | Fe/Al/Ca | Fe/Al/Ca | Fe/Al/Ca | Fe/Al/Ca |
| Weight ratio of the elements in the upper layer ferromagnetic metal powder | 100:0.2 | 100:25 | 100:5 | 100:0.5 | 100:10:2 | 100:10:0.5 | 100:10:7 | 100:10:12 |
| Lower layer Hc (Oe) | 650 | 650 | 650 | 650 | 720 | 700 | 715 | 705 |
| RF output (dB) | 1.0 | 0.5 | 0.9 | 1.2 | 2.4 | 2.0 | 2.3 | 2.1 |
| Luminance S/N (dB) | 0.6 | 0.2 | 0.5 | 0.8 | 1.6 | 1.4 | 1.5 | 1.4 |
| Chroma output (dB) | 3.4 | 2.5 | 3.2 | 3.3 | 4.2 | 3.8 | 4.1 | 3.8 |
| Chroma S/N (dB) | 0.6 | 0.3 | 0.4 | 0.6 | 1.2 | 0.9 | 1.1 | 1.0 |
| Bm'/Bm (%) | 89 | 97 | 85 | 92 | 96 | 96 | 96 | 96 |
| BET value (magnetic metal powder of the upper layer) (m²/g) | 55.5 | 55.5 | 55.5 | 55.5 | 55.5 | 55.5 | 55.5 | 55.5 |
| Average long axis length (magnetic metal powder of the upper layer) (μm) | 0.16 | 0.16 | 0.16 | 0.16 | 0.16 | 0.16 | 0.16 | 0.16 |
| Crystal size (magnetic metal powder of the upper layer) (Å) | 150 | 150 | 150 | 150 | 150 | 150 | 150 | 150 |
| BET value (magnetic metal powder of the lower layer) (m²/g) | 30 | 30 | 30 | 30 | 38 | 38 | 38 | 38 |
| Average long axis length (magnetic metal powder of the lower layer) (μm) | 0.32 | 0.32 | 0.32 | 0.32 | 0.24 | 0.24 | 0.24 | 0.24 |
| Crystal size (magnetic metal powder of the lower layer) (Å) | 430 | 430 | 430 | 430 | 400 | 400 | 400 | 400 |

EXAMPLES 12 THROUGH 25 AND COMPARATIVE EXAMPLES 7 THROUGH 10

Video tapes were prepared in the same manner as in Example 1 except that the average long axis length of the grains of the ferromagnetic powder in the lower layer magnetic composition and the average long axis length and composition of the ferromagnetic metal power in the upper layer magnetic composition were changed as shown in Tables 2 and 3, and their properties were evaluated.

The results are given in Tables 2 and 3.

TABLE 2

|  | Examples | | | | | | | Comparative Examples | | | | |
|---|---|---|---|---|---|---|---|---|---|---|---|---|
|  | 12 | 13 | 14 | 15 | 16 | 17 | 18 | 7 | 8 | 9 | 10 | 11 |
| Composition of the upper layer ferromagnetic metal powder | Fe/Al | Fe/Al | Fe/Al | Fe/Al | Fe/Al | Fe/Al | Fe/Al | Fe/Al | Fe/Al | Fe/Ni | Fe/Ni | Fe/Ni |
| Weight ratio of Fe and Al in the upper layer ferromagnetic metal powder | 100:5 | 100:0.5 | 100:5 | 100:5 | 100:5 | 100:5 | 100:5 | 100:25 | 100:5 | — | — | — |
| Average major axis diameter (μm) of the upper layer ferromagnetic metal powder | 0.16 | 0.16 | 0.22 | 0.24 | 0.27 | 0.22 | 0.27 | 01.6 | 0.16 | 0.16 | 0.16 | 0.16 |
| Average major axis diameter (μm) of the lower layer ferromagnetic metal powder | 0.16 | 0.16 | 0.21 | 0.24 | 0.23 | 0.27 | 0.27 | 0.16 | — | 0.16 | 0.16 | 0.16 |
| RF output (dB) | 1.7 | 1.7 | 1.1 | 0.7 | 0.1 | 0.3 | −0.3 | 1.2 | 1.6 | 0.3 | 0.7 | 0.7 |
| Luminance S/N (dB) | 1.2 | 1.1 | 0.7 | 0.6 | −0.1 | 0 | −0.2 | 0.7 | 1.1 | 0.0 | 0.7 | 0.6 |
| Chroma output (dB) | 2.8 | 2.9 | 3.3 | 3.5 | 3.0 | 3.5 | 3.5 | 2.3 | 0.1 | 1.9 | 0.2 | −0.5 |
| Chroma S/N (dB) | 0.8 | 0.7 | 0.7 | 0.7 | 0.2 | 0 | −0.1 | 0.4 | 0.7 | −0.3 | −0.3 | −0.5 |
| Bm'/Bm (%) | 95 | 90 | 95 | 95 | 95 | 95 | 95 | 96 | 95 | 83 | 84 | 83 |

TABLE 2-continued

|  | Examples | | | | | | | Comparative Examples | | | | |
| --- | --- | --- | --- | --- | --- | --- | --- | --- | --- | --- | --- | --- |
|  | 12 | 13 | 14 | 15 | 16 | 17 | 18 | 7 | 8 | 9 | 10 | 11 |
| Crystallite size (Angstrom) of the upper layer ferromagnetic powder | 150 | 150 | 200 | 230 | 260 | 200 | 260 | 150 | 150 | 150 | 150 | 150 |
| BET value ($m^2/g$) of the upper layer ferromagnetic powder | 55 | 55 | 42 | 38 | 35 | 42 | 35 | 55 | 55 | 55 | 55 | 55 |
| Drop-out at 12 dB (15 μs/sμs) | 25/65 | 37/102 | 31/76 | 35/78 | 41/95 | 43/94 | 45/98 | 44/141 | 87/317 | 83/271 | 80/266 | 91/297 |
| BET value (magnetic powder in the layers other than the upper layer) | 50 | 50 | 42 | 38 | 37 | 35 | 35 | 50 | — | 50 | 50 | 50 |
| Crystal size (magnetic powder in the layers other than the upper layer) | 320 | 320 | 370 | 400 | 390 | 415 | 415 | 320 | — | 320 | 320 | 320 |
| Lower layer Hc (Oe) | 900 | 900 | 880 | 870 | 885 | 845 | 845 | 900 | — | 450 | 1300 | 1550 |

TABLE 3

|  | Examples | | | | | | |
| --- | --- | --- | --- | --- | --- | --- | --- |
|  | 19 | 20 | 21 | 22 | 23 | 24 | 25 |
| Composition of the upper layer ferromagnetic metal powder | Fe/Al | Fe/Al | Fe/Al/Ca | Fe/Al/Ca | Fe/Al/Ca | Fe/Al/Ca | Fe/Al/Ca |
| Weight ratio of Fe and Al in the upper layer ferromagnetic metal powder | 100:10 | 100:20 | 100:10 | 100:10 | 100:10 | 100:10 | 100:10 |
| Average major axis diameter (μm) of the upper layer ferromagnetic metal powder | 0.16 | 0.16 | 0.16 | 0.16 | 0.16 | 0.16 | 0.14 |
| Crystallite size (Angstrom) of the upper layer ferromagnetic powder | 150 | 150 | 150 | 150 | 150 | 150 | 140 |
| BET value ($m^2/g$) of the upper layer ferromagnetic powder | 55 | 55 | 55 | 55 | 55 | 55 | 60 |
| Average major axis diameter (μm) of the lower layer ferromagnetic metal powder | 0.16 | 0.16 | 0.16 | 0.16 | 0.16 | 0.16 | 0.16 |
| RF output (dB) | 1.7 | 1.5 | 2.6 | 2.1 | 2.4 | 2.1 | 2.9 |
| Luminance S/N (dB) | 1.3 | 1.0 | 2.1 | 1.7 | 2.0 | 1.6 | 2.4 |
| Chroma output (dB) | 2.9 | 2.6 | 3.3 | 3.0 | 3.2 | 2.9 | 3.3 |
| Chroma S/N (dB) | 0.8 | 0.6 | 1.2 | 0.8 | 1.1 | 0.7 | 1.4 |
| Bm'/Bm (%) | 95 | 95 | 95 | 95 | 95 | 95 | 95 |
| Weight ratio of Fe and Ca in the upper layer ferromagnetic metal powder | — | — | 100:2 | 100:0.5 | 100:7 | 100:12 | 100:2 |
| Drop-out | 24/63 | 23/62 | 8/15 | 18/50 | 10/19 | 17/48 | 9/17 |
| BET value (magnetic powder in the layers other than the upper layer) | 50 | 50 | 50 | 50 | 50 | 50 | 50 |
| Crystal size (magnetic powder in the layers other than the upper layer) | 320 | 320 | 320 | 320 | 320 | 320 | 320 |
| Lower layer Hc (Oe) | 900 | 900 | 900 | 900 | 900 | 900 | 900 |

What is claimed is:

1. A magnetic recording medium comprising a support and, provided thereon, a plurality of magnetic layers including a top layer which contains a binder, a first magnetic metal powder having a weight ratio of aluminum to iron of 0.005 to 0.2, and a layer other than the top layer containing a binder and having a coercive force of not less than 500 Oe and not more than 1200 Oe.

2. The medium of claim 1 wherein the coercive force of the magnetic layer other then the top layer is not less than 650 Oe and not more than 1200 Oe.

3. The medium of claim 1 wherein the first magnetic metal powder contains calcium and has a weight ratio of calcium to iron of 0.001 to 0.10, the weight ratio of aluminum to iron being 0.005 to 0.2

4. The medium of claim 1 wherein the first magnetic metal powder has an average long-axis length of not more than 0.25 μm, and an average crystal size of less than 200 Å; nd the layer other than the top layer contains a second magnetic powder, having an average long-axis length of not more than 0.25 μm.

5. The medium of claim 1 wherein the first magnetic metal powder has a saturation magnetization value of not less than 70 emu/g.

6. The medium of claim 2 wherein the layer other than the top layer comprises a cobalt containing iron oxide wherein an atom ratio of oxygen to iron is more than 1.33 and not more than 1.5.

7. The medium of claim 4 wherein the second magnetic powder has a BET value of 20 to 60 $m^2/g$.

8. A magnetic recording medium comprising a nonmagnetic support and, provided thereon, a plurality of magnetic layers including a top layer which contains a binder, a first magnetic metal powder having an average long-axis length of not more than 0.25 μm, an average crystal size of less than 200 Å, a weight ratio of aluminum to iron of 0.005 to 0.2, and a saturation magnetization value of to less than 120 emu/g/; and a layer other than the top layer containing a binder and having a coercive force of not less than 650 Oe and not more than 1200 Oe, and containing a second magnetic powder, which has an average long-axis length of not more than 0.25 μm, and BET value of 20 to 60 m²/g.

9. The medium of claim 8, wherein the layer other than the top layer comprises a cobalt containing iron oxide wherein an atom ratio of oxygen to iron is more than 1.33 and not more than 1.5.

10. The medium of claim 8 wherein the first magnetic metal powder contains calcium and a weight ratio of calcium to iron of 0.001 to 0.1, and the weight ratio of aluminum to iron ob 0.005 to 0.2.

* * * * *